Patented June 17, 1952

2,601,179

UNITED STATES PATENT OFFICE 2,601,179

VAT DYES OF THE ANTHRAQUINONE-OXDIAZOLE SERIES

Frederic B. Stilmar, Wilmington, Del., assignor to E. I. du Pont de Nemours and Company, Wilmington, Del., a corporation of Delaware No Drawing. Application March 24, 1950, Serial No. 151,804

5 Claims. (Cl. 260—296)

This invention relates to the preparation of new dyes of the anthraquinone series, and more particularly to the preparation of anthraquinone oxdiazoles which dye cotton from the usual hydrosulfite vats in red shades.

The anthraquinone vat dyes are known to be of particular value because of their excellent fastness properties, and, while a large range of colors has been produced commercially, there has not been produced a red dye in this class which will dye in the bright shades desirable and have the good fastness properties of dyes of this class in general. Several red dyes have been produced in the anthraquinone series, but they lack the strength or brightness or certain fastness properties which are particularly desirable and which usually identify the dyes of this class.

It is an object of the present invention to produce new vat dyes of the anthraquinone series which dye in relatively bright red shades and which exhibit excellent fastness properties and high tinctorial strength. A more specific object of the invention is to produce oxdiazoles of the anthraquinone series by effecting ring closure of the acylated hydrazines produced by condensing 1-amino- or 1-nitroanthraquinone - 2 - carbonyl hydrazines with organic dicarboxylic acid chlorides.

The compounds of this invention are prepared by reacting 1-aminoanthraquinone - 2 - carbonyl hydrazine or 1 - nitroanthraquinone-2-carbonyl hydrazine with an acid chloride of a heteromonocyclic dicarboxylic acid in which the heterocyclic ring contains at least 4 and not more than 5 carbon atoms and one of the elements S, O and N. The reaction is preferably carried out at elevated temperatures in an inert solvent such as nitrobenzene or the chlorobenzenes, resulting in high yields of the acylated hydrazines of the general formula:

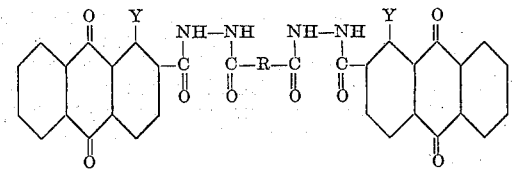

in which Y stands for a substituent of the group consisting of —NH₂ and —NO₂ and R stands for a heteromonocyclic nucleus containing at least 4 and not more than 5 carbon atoms and one of the elements S, O and N, being the nucleus of a heteromonocyclic dicarboxylic acid.

The acylated hydrazines thus obtained are subjected to ring closure reaction which is brought about by the aid of acid condensing agents such as thionyl chloride, phosphorus oxychloride, p- toluene sulfonic acid, etc. In this reaction the hydrazide groups are ring closed to the oxdiazoles to give compounds of the general formula:

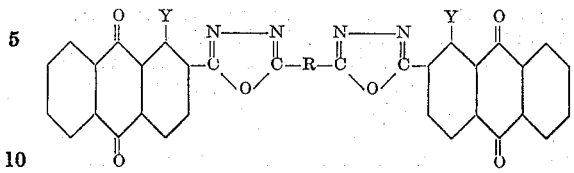

in which R and Y have the same significance as above given. The ring closure reaction is preferably carried out at temperatures of from 160° to 175° C., although higher or lower temperatures such as from 130° to 210° C. may be employed, depending upon the particular acid condensing agent used. The ring closure is preferably effected in an inert organic solvent such as the aromatic hydrocarbons or their nitrated or chlorinated derivatives, of which nitrobenzene, o-dichlorobenzene, trichlorobenzene and alpha-chloronaphthalene, are illustrative.

The following examples are given to illustrate the invention. The parts used are by weight, unless otherwise specified.

Example 1

One molecular quantity of thiophene-2,5-dicarbonyl chloride is reacted with 2 molecular quantities of 1-nitroanthraquinone-2-carbonyl hydrazine in from 20 to 30 parts of nitrobenzene per part of the hydrazine compound employed at 160° C. for two hours or until the evolution of HCl is complete. The resulting bisacylated hydrazide is filtered off. Ten (10) parts of this bis-acylated hydrazide is reacted with 20 parts of thionyl chloride in 200 parts of nitrobenzene by heating under reflux at 170° to 175° C. for six hours. The nitro-bis-oxdiazole is obtained as long, colorless needles in a yield of approximately 6.5 parts. It has the formula:

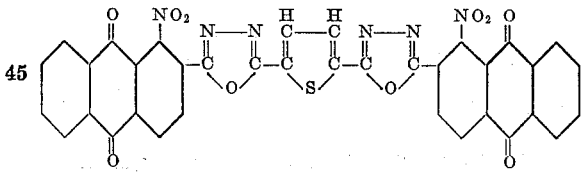

Example 2

The nitro-bis-oxdiazole product of Example 1 is converted to the red amino dye by passing ammonia gas at 175°–185° C. through a suspension of 3 parts of Example 1 nitro-bis-oxdiazole in 250 parts of nitrobenzene. The reaction product consists mainly of red needles of the final dye.

The product dyes cotton in red shades from a brown-red vat. It dissolves in concentrated sulfuric acid with a pale yellow color, and has the formula:

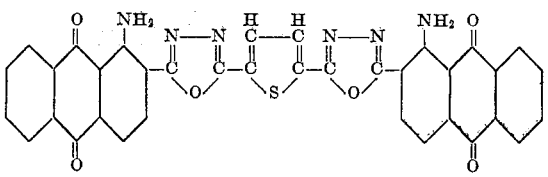

Example 3

Six (6) parts of the bis-acylated hydrazide of the formula:

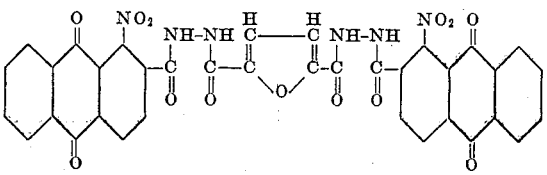

prepared in the same manner as the thiophene compound of Example 1 by reacting 2 mols of 1-nitroanthraquinone-2-carbonyl hydrazine with one mol of furane 2,5-dicarbonyl chloride in 20 to 30 parts of o-dichlorobenzene per part of hydrazine compound at 160°–170° C. for two to three hours and filtering off the product, is reacted with 12 parts of thionyl chloride in 130 parts of o-dichlorobenzene by heating under reflux to 150°–160° C. for 16 hours. The nitro-bis-oxdiazole, as small pale yellow crystals, is filtered off and washed with alcohol, giving the oxdiazole compound in a yield of 3.7 parts which dissolves in sulfuric acid with almost no color.

Example 4

Three (3) parts of nitro-bis-oxdiazole of Example III and 240 parts of nitrobenzene are heated to 175°–185° C. and a current of ammonia is passed through the suspension for several hours. The resulting reaction mass consists of red crystals of the dye of the formula:

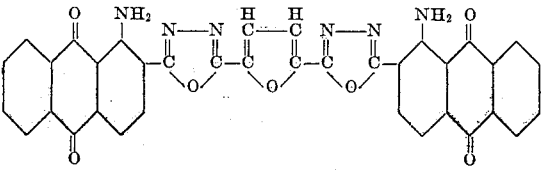

which is isolated in a yield of 2.45 parts. The color of the vat of the new dye is violet-red and its solution in concentrated sulfuric acid is almost colorless.

Example 5

Eight (8) parts of the bis-acylated hydrazide of the formula:

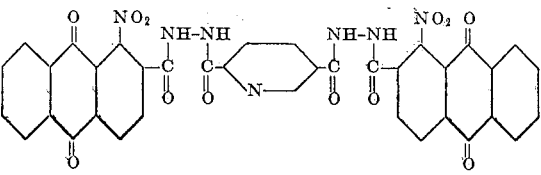

(obtained from 2 mols of 1-nitroanthraquinone-2-carbonyl hydrazine and 1 mol of pyridine 2,5-dicarbonyl chloride by heating in 20 to 30 parts of o-dichlorobenzene per part of hydrazine compound at 160°–170° C. for two hours) are heated with 16 parts of thionyl chloride in 180 parts of o-dichlorobenzene at reflux (160°–170° C.) for ten hours. The product is filtered off and washed with benzene. The resulting bis-oxdiazole is obtained in good yield.

Example 6

Two (2) parts of the nitro-bis-oxdiazole of Example 5 are heated in 240 parts of nitrobenzene at 175°–185° C. and a current of ammonia passed through the solution for six hours. The resulting brownish-red product is isolated by filtration in a yield of 1.4 parts. It dyes cotton a bright red shade from a violet-red hydrosulfite vat, and has the formula:

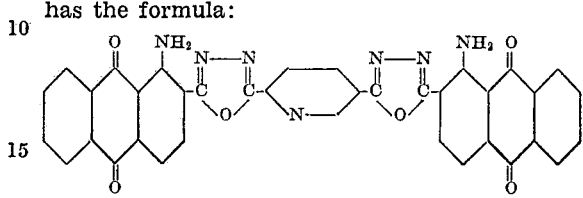

The anthraquinone-2-carbonyl hydrazine employed in the preparation of these new compounds may be prepared by the process more particularly disclosed in my U. S. Patent 2,464,831 of March 22, 1949.

If desired, the acylated anthraquinone-carbonyl hydrazines as described above may be ring closed to the oxdiazole compound without isolation from the nitrobenzene or other solvent in which they are formed, by adding the acid condensing agent and continuing heating at ring closure temperatures, generally within the range of 130° to 210° C.

The dinitro-oxdiazole compounds of this invention may be employed directly in dyeing or printing processes, for during the vatting step they are reduced to the corresponding amines. In most cases, however, the nitro groups may be replaced by the amino groups through amination either with ammonia in an organic solvent at elevated temperatures or with ammonium hydroxide under pressure at temperatures of from 120° to 200° C. These new vat dyes may be purified, when found desirable, by recrystallization from sulfuric acid or by treatment with oxidizing agent such as sodium dichromate in aqueous sulfuric acid suspensions.

The dicarboxylic acid chlorides may be formed as a preliminary step in the preparation of the anthraquinone-carbonyl hydrazines. The latter can then be condensed without isolation from the organic solvent in which it is formed, in the manner particularly illustrated in my co-pending application Serial No. 81,618 filed March 15, 1949, now Patent No. 2,567,132, November 4, 1951. It is generally preferred, however, to form the dicarboxylic acid chloride, and after its isolation reacting with the anthraquinone-2-carbonyl hydrazine. It will be obvious that other acid halides may be employed in place of the acid chloride itself.

While the acylated hydrazines carrying the nitro groups may be vatted to produce the corresponding amines prior to ring closure to the oxdiazoles, it is usually found desirable to effect ring closure of the nitro compounds prior to their reduction to the corresponding amine.

I claim:

1. The anthraquinone oxdiazole compounds of the general formula:

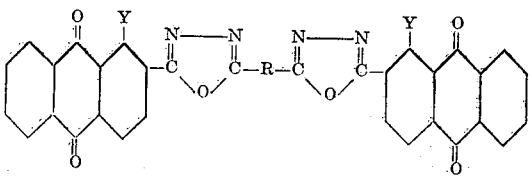

in which Y stands for a substituent of the group consisting of —NH₂ and —NO₂ and R stands for an unsubstituted radical of the group consisting of thiophene, furane and pyridine radicals which are attached through the 2,5-positions.

2. The anthraquinone oxdiazole compound of the formula:

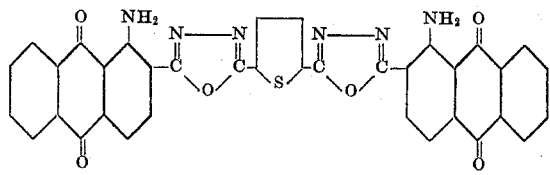

3. The anthraquinone oxdiazole compound of the formula:

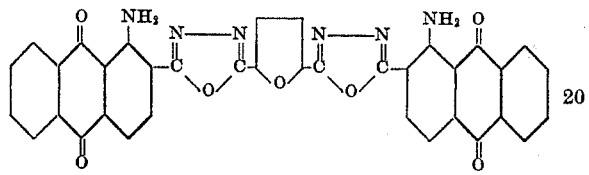

4. The anthraquinone oxdiazole compound of the formula:

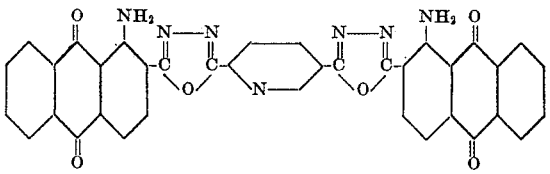

5. The anthraquinone oxdiazole compound of the formula:

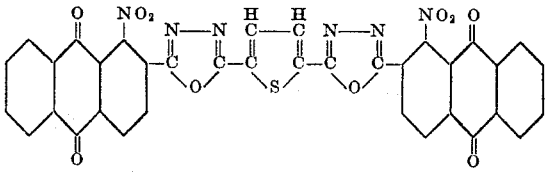

FREDERIC B. STILMAR.

No references cited.